United States Patent
Inoue et al.

(10) Patent No.: US 6,733,849 B2
(45) Date of Patent: May 11, 2004

(54) HIGH-SPEED CHARGE TRANSPORT MATERIAL, PRODUCTION METHOD THEREOF, PHOTOELECTRIC CONVERSION DEVICE AND ELECTROLUMINESCENCE DEVICE

(75) Inventors: Masaaki Inoue, Tokyo (JP); Masakatsu Ukon, Tokyo (JP); Tsuyoshi Watanabe, Sunnyvale, CA (US); Yo Shimizu, Ikeda (JP); Hirosato Monobe, Ikeda (JP)

(73) Assignees: JSR Corporation, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 75 days.

(21) Appl. No.: 10/102,839

(22) Filed: Mar. 22, 2002

(65) Prior Publication Data

US 2002/0166993 A1 Nov. 14, 2002

(30) Foreign Application Priority Data

Mar. 23, 2001 (JP) ......................................... 2001-084956

(51) Int. Cl.⁷ .......................... C09K 19/58; H01L 31/04
(52) U.S. Cl. .......................... 428/1.4; 428/1.1; 428/917; 252/299.3; 136/256; 136/257; 136/263
(58) Field of Search ................ 428/1.1, 1.4; 252/299.3; 136/256, 257, 263

(56) References Cited

U.S. PATENT DOCUMENTS

| | | | |
|---|---|---|---|
| 5,730,900 A | * | 3/1998 | Kawata ................. 252/299.01 |
| 5,730,903 A | | 3/1998 | Okazaki |
| 5,736,068 A | | 4/1998 | Haeussling et al. |
| 6,338,808 B1 | * | 1/2002 | Kawata et al. ........... 252/299.4 |
| 6,444,280 B1 | * | 9/2002 | Matsuoka et al. ........... 428/1.3 |

FOREIGN PATENT DOCUMENTS

| | | | |
|---|---|---|---|
| EP | 0 385 329 | | 9/1990 |
| JP | 10-282466 | | 10/1998 |
| JP | 10-321371 | | 12/1998 |
| JP | 11-087064 | | 3/1999 |
| JP | 11-097176 | | 4/1999 |
| WO | WO 95/14652 | * | 6/1995 |
| WO | WO 99/32537 | | 7/1999 |

OTHER PUBLICATIONS

M. Okazaki, et al., Polymers for Advanced Technologies, vol. 11, No. 8–12, pp. 398–403, XP–000977311, "Polymerizable Discoticnematic Triphenylene Derivatives and Their Application to an Optically Anisotropic Film", Aug. 2000.

M. Werth, et al., Makromolekulare Chemie, vol. 14, No. 6, pp. 329–338, XP–000381623, "The Role of the Spacer in Discotic Polymers", Jun. 1, 1993.

I. Bleyl, et al., Database INSPEC 'Online! Institute of Electrical Engineers, vol. 299, p. 1, AN–5974275, XP–002200876, "Photopolymerization and Transport Properties of Liquid Crystalline Triphenylenes", Jun. 1996.

* cited by examiner

Primary Examiner—Shean C. Wu
(74) Attorney, Agent, or Firm—Oblon, Spivak, McClelland, Maier & Neustadt, P.C.

(57) ABSTRACT

According to the present invention, a high-speed charge transport material is provided which comprises a polymer of a liquid crystal material which is a triphenylene compound having at least one specific unsaturated group in a molecule. The high-speed charge transport material can achieve a high-speed charge transport of not lower than $1 \times 10^{-4}$ $cm^2 \cdot V^{-1} \cdot S^{-1}$ within a wide temperature range.

25 Claims, 1 Drawing Sheet

F I G. 1
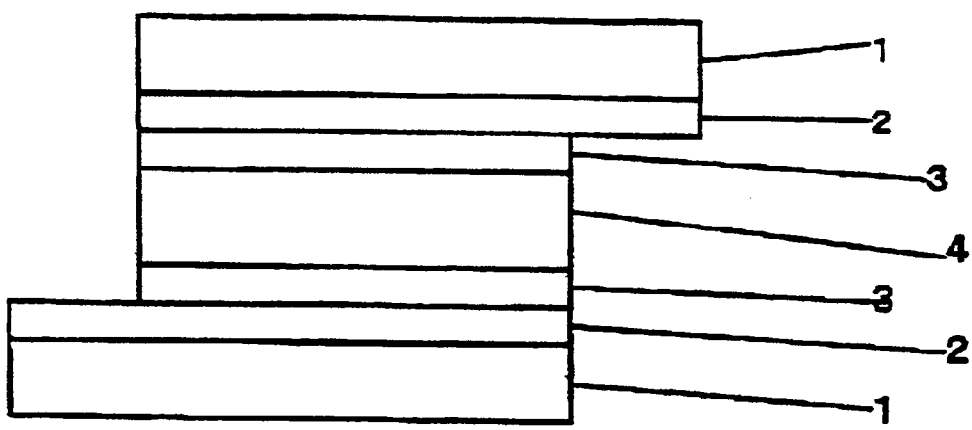

HIGH-SPEED CHARGE TRANSPORT MATERIAL, PRODUCTION METHOD THEREOF, PHOTOELECTRIC CONVERSION DEVICE AND ELECTROLUMINESCENCE DEVICE

BACKGROUND OF THE INVENTION

1. Field of the Invention

This invention relates to a high-speed charge transport material, production method thereof, photoelectric conversion device and electroluminescence device.

2. Description of the Prior Art

Since high-speed transfer of a hole which is a positive charge in a state called a columnar phase of a triphenylene compound which is one of discotic liquid crystals was reported, charge transportability and photoconductivity of a discotic liquid crystal have been receiving attention. In general, a degree of charge transfer of a photoconductive material is reported to be about 100 to 0.1 $cm^2 \cdot V^{-1} \cdot S^{-1}$ in a semiconductor or organic crystal which is said to have high-speed charge transfer. However, a degree of charge transfer that can be achieved in a general organic compound polycrystal or polymer is only about $10^{-5}$ to $10^{-6}$ $cm^2 \cdot V^{-1} \cdot S^{-1}$. It is very difficult to obtain a high quality organic crystal material which is necessary to attain practical performance. Meanwhile, a semiconductor is considered to be inappropriate for obtaining a large photocurrent. From these viewpoints, merits can be expected from application of a discotic liquid crystal whose molecular alignment is easy to control by an external field to an organic photoconductor.

However, even if a compound exhibits liquid crystallinity, it exhibits a liquid crystal state only within a certain temperature range and switches to another state once it falls outside the range, thereby making high-speed charge transport impossible from then on. Further, the discotic liquid crystal needs to be heated to exhibit liquid crystallinity, which has limited its applications.

SUMMARY OF THE INVENTION

An object of the present invention is to provide a novel high-speed charge transport material.

Another object of the present invention is to provide a method for producing the high-speed charge transport material of the present invention.

Still another object of the present invention is to provide a photoelectric conversion device and an electroluminescence device having a layer composed of the high-speed charge transport material of the present invention.

Other objects and advantages of the present invention will be apparent from the following description.

According to the present invention, firstly, the above objects and advantages of the present invention are achieved by a high-speed charge transport material which comprises a polymer of a liquid crystal material represented by the following formula (1):

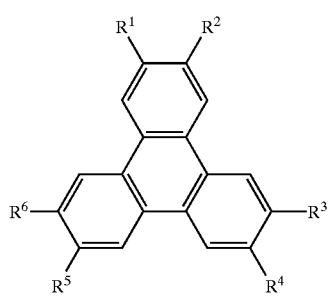

(1)

wherein $R^1$ to $R^6$ each are independently a group represented by the following formula (2):

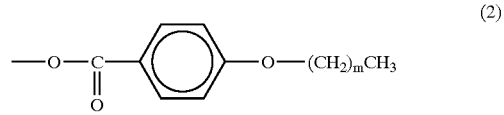

(2)

wherein m is a number of 1 to 15, or a group represented by the following formula (3):

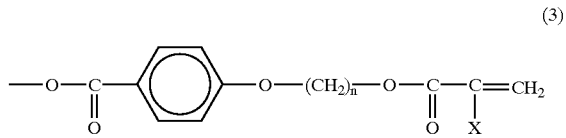

(3)

wherein X is a hydrogen atom or methyl group, and n is a number of 1 to 15, with the proviso that at least one of $R^1$ to $R^6$ is a group represented by the formula (3).

Secondly, the above objects and advantages of the present invention are achieved by a method for preparing a high-speed charge transport material, which comprises irradiating a liquid crystal material represented by the above formula (1) with light between substrates each having an electrode and a liquid crystal alignment film to be polymerized there between.

Thirdly, the above objects and advantages of the present invention are achieved by a method for preparing a high-speed charge transport material, which comprises forming a coating having a liquid crystal material represented by the above formula (1) on a substrate having an electrode and a liquid crystal alignment film and irradiating the coating with light.

Fourthly, the above objects and advantages of the present invention are achieved by a photoelectric conversion device having a layer composed of the high-speed charge transport material of the present invention.

Fifthly, the above objects and advantages of the present invention are achieved by an electroluminescence device having a layer composed of the high-speed charge transport material of the present invention.

BRIEF DESCRIPTION OF THE DRAWINGS

FIG. 1 is a schematic explanatory diagram of an ITO sandwich cell.

DETAILED DESCRIPTION OF THE PREFERRED EMBODIMENT

A discotic liquid crystal is a liquid crystal phase exhibited by a molecule which is spread two-dimensionally and generally has a structure in which several side chains are bonded to a base nucleus having a ring structure. Illustrative examples of the base nucleus include structures such as benzene, triphenylene, porphyrin, phthalocyanine and cyclohexane. In the present invention, compounds having the above structures are used. These compounds can be used solely or in admixture of two or more. Further, the high-speed charge transport material of the present invention can be obtained by polymerization of a discotic liquid crystal molecule represented by the above formula (1).

In the above formula (1), at least one of $R^1$ to $R^6$ is a group having a polymerizable functional group which is represented by the formula (3).

In the present invention, the liquid crystal material preferably comprises (i) a mixture of a plurality of liquid crystal materials represented by the formula (1) and having different numbers of a group represented by the formula (2) and a group represented by the formula (3) in one molecule, the number of a group represented by the formula (3) in the mixture being 1.1 to 2.9 per molecule on the average, or (ii) a single liquid crystal material represented by the formula (1) which contains 1 to 4, more preferably 2 to 3 groups represented by the formula (3) in one molecule.

Further, a discotic liquid crystal compound having no polymerizable functional group may be added to the liquid crystal material in the present invention in such an amount which does not hinder polymerization from proceeding. The discotic liquid crystal compound having no polymerizable functional group is desirably used in an amount of preferably not larger than 80 parts by weight, more preferably not larger than 50 parts by weight, based on 100 parts by weight of the liquid crystal material represented by the above formula (1).

As a polymerization method to be used in the present invention, thermal polymerization by means of heating or photopolymerization by means of irradiation of radiation can be selected. Of these, photopolymerization is preferably carried out so as to carry out polymerization advantageously with an alignment of liquid crystal maintained. The term "radiation" as used herein means infrared radiation, visible radiation, ultraviolet radiation and ionizing radiation such as an X ray, electron beam, α beam, β beam or γ beam. In the photopolymerization, a photoinitiator may be added, and a photosensitizer may also be added as required. The photoinitiator may be any photoinitiator as long as it is decomposed by irradiation of light and produces radicals to initiate polymerization. Illustrative examples of the photoinitiator include acetophenone, acetophenone benzyl ketal, 1-hydroxycyclohexylphenylketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyldimethylketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethylbenzoyldiphenylphosphineoxide and bis-(2,6-dimethoxybenzoyl)-2,4,4-trimethylpentylphosphine oxide.

Illustrative examples of commercially available photopolymerization initiators include Irgacure 184, 369, 651, 500, 819, 907, 784 and 2959, CGI-1700, CGI-1750, CGI-1850, CG24-61 and Darocur 1116 and 1173 (products of Ciba Specialty Chemicals Co., Ltd.), Lucirin TPO, LR8893 and LR8970 (products of BASF Ltd.), and Ubecryl P36 (product of UCB CO., LTD.).

Meanwhile, illustrative examples of the photosensitizer include triethylamine, diethylamine, N-methyldiethanolamine, ethanolamine, 4-dimethylaminobenzoic acid, methyl 4-dimethylaminobenzoic acid, ethyl 4-dimethylaminobenzoic acid and isoamyl 4-dimethylaminobenzoic acid. Illustrative examples of commercially available photosensitizers include Ubecryl P102, 103, 104 and 105 (products of UCB CO., LTD.).

In addition, in addition to the above components, a variety of additives such as an antioxidant, light stabilizer, thermal polymerization inhibitor, leveling agent, surfactant, preservation stabilizer, plasticizer, lubricant, solvent, age resistor and wettability improving agent may also be added as required.

As for the charge transport material, a direction of high-speed charge transfer in a columnar phase of the discotic liquid crystal material is preferably parallel to a direction along the axis of the column, that is, the alignment axis of discotic liquid crystal molecules, and is preferably perpendicular to the electrodes. In this case, the perpendicular direction covers ±45° from 90°. The molecular axis of discotic liquid crystal is defined to the perpendicular to the molecular plane.

The method for preparing the charge transport material of the present invention, firstly, comprises injecting the above liquid crystal material into a cell which is formed between substrates each having an electrode and a liquid crystal alignment film and irradiating the liquid crystal material with light with the liquid crystal material aligned so as to fix the aligned state by means of photopolymerization.

Further, the method for preparing the charge transport material of the present invention, secondly, comprises forming a coating containing the above liquid crystal material on a substrate having an electrode and a liquid crystal alignment film and irradiating the coating with light. The formation of the coating is carried out by applying the liquid crystal material dissolved with a solvent on the substrate by such a method as spin coating. Illustrative example of a solvent is a toluene, a xylene, a hexane, an ethyl acetate, a chloroform, or the like. The method is particularly useful in laminating a layer having a different function from that of the obtained charge transport material on the charge transport material.

The above liquid crystal alignment film is exemplified by a film of a known resin such as a polyimide or a film of a compound including an extended π-conjugated electron system. Illustrative examples of the above compound including an extended π-conjugated electron system includes a phthalocyanine, porphyrin, and metal complexes thereof. Liquid crystal alignment films obtained from these compounds have conductivity. Meanwhile, as the above electrode, a transparent electrode such as an ITO may be used, for example.

Liquid crystal phases of discotic liquid crystals are classified into such phases as a discotic nematic phase, a columnar hexagonal phase, a columnar rectangular phase and a columnar oblique phase. In the object of the present invention, any of these liquid phase crystals may be used as long as an alignment axis is perpendicular to the electrodes. However, the discotic nematic phase is preferred since it is easy to orient.

In the present invention, by polymerization of discotic liquid crystals having polymerizable functional group, fixation of molecular arrangement at a given temperature becomes possible, and a high-speed charge transport of not lower than $1\times10^{-4}$ $cm^2 \cdot V^{-1} \cdot S^{-1}$. which has been exhibited basically only within a certain temperature range can be attained within a wider temperature range.

EXAMPLES

The present invention will be further described with reference to examples hereinafter. However, the present invention shall not be limited to these examples.

Example 1

A mixture (liquid crystal material) of 100 parts by weight of a compound I, 1 part by weight of 2,2-dimethoxy-2-phenylacetophenone and 0.02 parts by weight of 2,6-di-t-butyl-4-methylphenol was injected into an ITO sandwich cell (liquid crystal alignment film: polyimide) shown in FIG. 1 having a distance between electrodes of 30 μm. After heated to 200° C., the cell was cooled to 140° C. at a temperature gradient of 5° C./min. At this point, liquid crystals showed a discotic nematic phase. With the cell kept at 140° C., light of around 365 nm was extracted from light from SPOTCURE SP-3 (product of USHIO INC.; using a high-pressure mercury-vapor lamp) by means of a band pass filter MX0365 (product of ASAHI SPECTR CO., LTD.) and irradiated to the cell at a light intensity of 1 mW/cm$^2$ and 2 J/cm$^2$.

The sample was measured for a charge transfer speed of a hole at 140° C. As a result, a high-speed charge transfer of $1\times10^{-3}$ cm$^2\cdot$V$^{-1}\cdot$S$^{-1}$ could be observed.

The compound I is a compound represented by the formula (1) in which four of $R^1$ to $R^6$ each are a group represented by the formula (2) in which m is 1 and the remaining groups each are a group represented by the formula (3) in which n is 8 and X is a hydrogen atom.

In FIG. 1, reference numeral 1 indicates a glass substrate, 2 indicates an ITO electrode, 3 indicates a liquid crystal alignment film, and 4 indicates a charge transport material (liquid crystal material).

Example 2

The procedures of Example 1 were repeated except that the cell was cooled to 170° C. and the irradiation of light was conducted at 170° C. A high-speed charge transfer of $8\times10^{-4}$ cm$^2\cdot$V$^{-1}\cdot$S$^{-1}$ could be observed in this sample.

Example 3

The procedures of Example 1 were repeated except that 2,2-dimethoxy-2-phenylacetophenone was not added and the light was irradiated at a light intensity of 10 mW/cm$^2$ and 20 J/cm$^2$. A high-speed charge transfer of $1\times10^{-3}$ cm$^2\cdot$V$^{-1}\cdot$S$^{-1}$ could be observed in this sample.

Example 4

The procedures of Example 1 were repeated except that measurement of a degree of charge transfer was carried out at 200° C. A high-speed charge transfer of $1\times10^{-3}$ cm$^2\cdot$V$^{-1}\cdot$S$^{-1}$ could be observed.

Example 5

The procedures of Example 1 were repeated except that a cell having an ITO substrate on which a phthalocyanine copper complex was vapor-deposited to a film thickness of 20 nm was used as the ITO sandwich cell. A high-speed charge transfer of $1\times10^{-3}$ cm$^2\cdot$V$^{-1}\cdot$S$^{-1}$ could be observed.

Reference Example 1

The procedures of Example 1 were repeated except that the cell was cooled to 190° C. and the irradiation of light was conducted at 190° C. This sample was an isotropic phase at 190° C. The degree of charge transfer in this sample was $4\times10^{-5}$ cm$^2\cdot$V$^{-1}\cdot$S$^{-1}$.

As described above, according to the present invention, a charge transport material can be provided which can make high-speed charge transfer which has heretofore been exhibited only within a certain temperature range achievable within a wider temperature range.

What is claimed is:

1. A high-speed charge transport material which comprises a polymer of a liquid crystal material represented by the following formula (1):

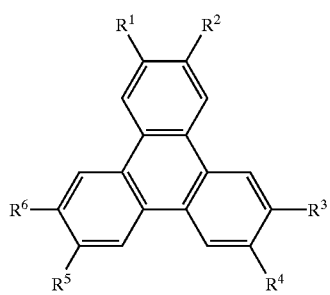

(1)

wherein $R^1$ to $R^6$ each are independently a group represented by the following formula (2):

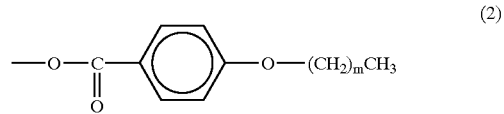

(2)

wherein m is a number of 1 to 15, or a group represented by the following formula (3):

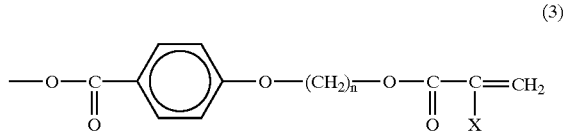

(3)

wherein X is a hydrogen atom or methyl group, and n is a number of 1 to 15, with the proviso that at least one of $R^1$ to $R^6$ is a group represented by the formula (3), and that at least one of $R^1$ to $R^6$ is a group represented by the formula (2).

2. A high-speed charge transport material of claim 1, wherein the liquid crystal material comprises a mixture of a plurality of liquid crystal materials represented by the formula (1) and having different numbers of a group represented by the formula (2) and a group represented by the formula (3) in one molecule, the number of a group represented by the formula (3) in the mixture being 1.1 to 2.9 per molecule on the average.

3. A high-speed charge transport material of claim 1, wherein the liquid crystal material contains 1 to 4 groups represented by the formula (3) in one molecule.

4. A method for preparing a high-speed charge transport material, which comprises:

irradiating a liquid crystal material represented by the formula (1) with light between substrates each having an electrode and a liquid crystal alignment film to be polymerized there between; wherein formula (1) is defined as follows:

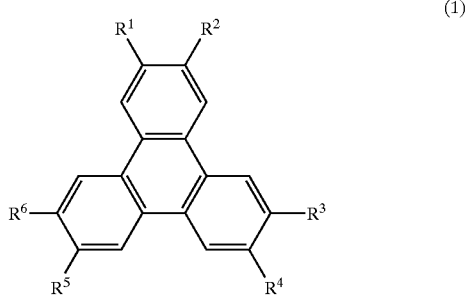

(1)

wherein $R^1$ to $R^6$ each are independently a group represented by the following formula (2):

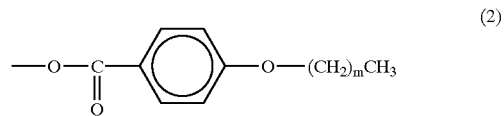

(2)

wherein is a number of 1 to 15,
or a group represented by the following formula (3):

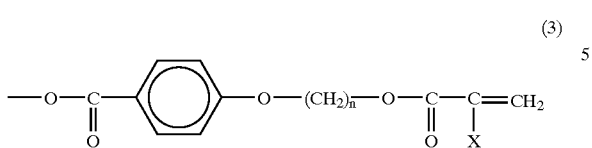

wherein X is a hydrogen atom or methyl group, and n is a number of 1 to 15,
with the proviso that at least one of $R^1$ to $R^6$ is a group represented by the formula (3), and that at least one of $R^1$ to $R^6$ is a group represented by the formula (2).

5. A method for preparing a high-speed charge transport material, which comprises forming a coating having a liquid crystal material represented by the formula (1) on a substrate having an electrode and a liquid crystal alignment film and irradiating the coating with light; wherein formula (1) is defined as follows:

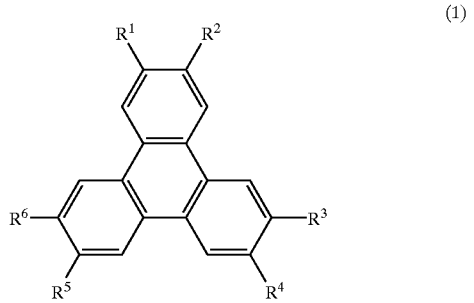

wherein $R^1$ to $R^6$ each are independently a group represented by the following formula (2):

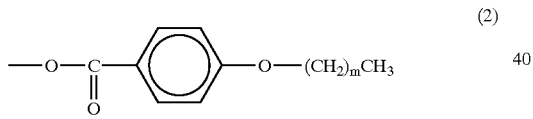

where m is a number of 1 to 15,
or a group represented by the following formula (3):

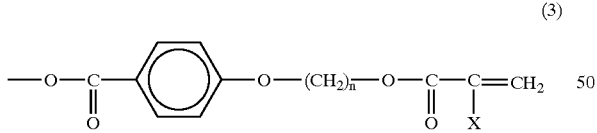

wherein X is a hydrogen atom or methyl group and n is a number of 1 to 15,
with the proviso that at least one of $R^1$ to $R^6$ is a group represented by the formula (3), and that at least one of $R^1$ to $R^6$ is a group represented by the formula (2).

6. A photoelectric conversion device having a layer which comprises the high-speed charge transport material of claim 1.

7. An electroluminescence device having a layer which comprises the high-speed charge transport material of claim 1.

8. A high-speed charge transport material of claim 1, further comprising a liquid crystal material represented by the following formula (4):

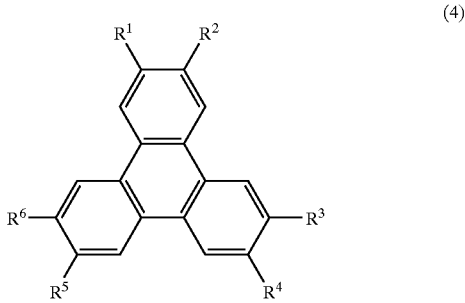

wherein $R^1$ to $R^6$ each are independently a group represented by the following formula (5):

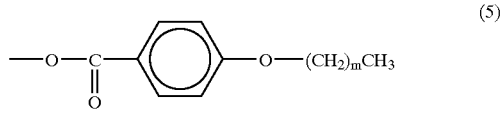

wherein m is a number of 1 to 15; and wherein the liquid crystal material of formula (4) is in amount not larger than 80 parts by weight, based on 100 parts by weight of the liquid crystal material of formula (1).

9. A photoelectric conversion device having a layer which comprises the high-speed charge transport material of claim 8.

10. An electroluminescence device having a layer which comprises the high-speed charge transport material of claim 8.

11. A high-speed charge transport material of claim 1, further comprising a liquid crystal material represented by the following formula (4):

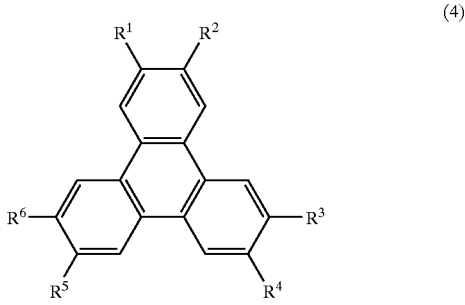

wherein $R^1$ to $R^6$ each are independently a group represented by the following formula (5):

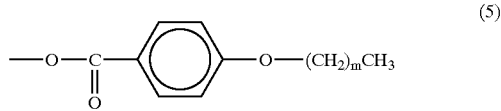

wherein m is a number of 1 to 15; and wherein the liquid crystal material of formula (4) is in amount not larger than 50 parts by weight, based on 100 parts by weight of the liquid crystal material of formula (1).

12. A photoelectric conversion device having a layer which comprises the high-speed charge transport material of claim 11.

13. An electroluminescence device having a layer which comprises the high-speed charge transport material of claim 11.

14. A high-speed charge transport material of claim 1, wherein the polymer of the liquid crystal material is thermally polymerized by heating the liquid crystal material of formula (1).

15. A high-speed charge transport material of claim 1, wherein the polymer of the liquid crystal material of formula (1) is photopolymerized by irradiating the liquid crystal material of formula (1) with radiation; wherein the radiation is selected from the group consisting of infrared radiation, visible radiation, ultraviolet radiation, and ionizing radiation.

16. A high-speed charge transport material of claim 1, wherein the polymer of a liquid crystal material of formula (1) is photopolymerized by irradiating the liquid crystal material of formula (1) with radiation; wherein the radiation is ultraviolet radiation.

17. A high-speed charge transport material of claim 16, further comprising a photoinitiator.

18. A high-speed charge transport material of claim 17, wherein the photoinitiator is selected from the group consisting of acetophenone, acetophenone benzyl ketal, 1-hydroxycyclohexylphenylketone, 2,2-dimethoxy-2-phenylacetone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyldimethylketal, 1-(4-isopropylphenyl)-2-hydroxy-2-methylpropan-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethylbenzoyldiphenylphosphine oxide, and bis(2,6-dimethoxybenzoyl)-2,4,4-trimethylpentylphosphine oxide.

19. A high-speed charge transport material of claim 17, further comprising a photosensitizer.

20. A high-speed charge transport material of claim 19, wherein the photosensitizer is selected from the group consisting of triethylamine, diethylamine, N-methyldiethylanolamine, ethanolamine, 4-diemthylaminobenzoic acid, methyl 4-dimethylaminobenzoic acid, ethyl 4dimethylaminobenzoic acid, and isoamyl 4-dimethylaminobenzoic acid.

21. A high-speed charge transport material which comprises a polymer of a mixture of a plurality of liquid crystal materials represented by the following formula (1):

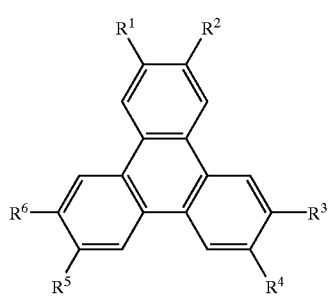

(1)

wherein $R^1$ to $R^6$ each are independent groups having different numbers of groups represented by formula (2) and formula (3) in one molecule, wherein the number of groups represented by the formula (3) in the mixture being 1.1 to 2.9 per molecule; wherein a group represented by formula (2) is as follows:

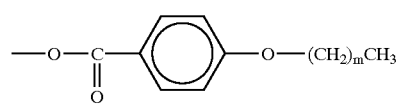

(2)

where m is a number of 1 to 15, and a group represented by the formula (3) is as follows:

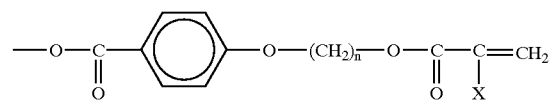

(3)

wherein X is a hydrogen atom or methyl group, and n is a number of 1 to 15.

22. A method for preparing a high-speed charge transport material, which comprises:

irradiating a liquid crystal material represented by the formula (1) with light between substrates each having an electrode and a liquid crystal alignment film to be polymerized there between; wherein formula (1) is defined as follows:

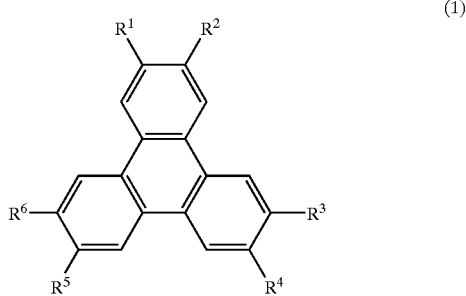

(1)

wherein $R^1$ to $R^6$ each are independent groups having different numbers of groups represented by formula (2) and formula (3) in one molecule, wherein the number of groups represented by the formula (3) in the mixture being 1.1 to 2.9 per molecule; wherein a group represented by formula (2) is as follows:

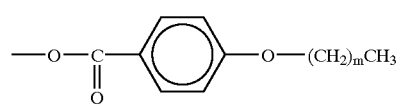

(2)

where m is a number of 1 to 15, and a group represented by the formula (3) is as follows:

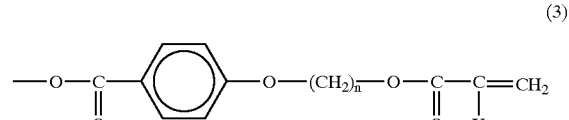

(3)

wherein X is a hydrogen atom or methyl group, and n is a number of 1 to 15.

23. A method for preparing a high-speed charge transport material, which comprises forming a coating having a liquid crystal material represented by the formula (1) on a substrate having an electrode and a liquid crystal alignment film and irradiating the coating with light;

wherein formula (1) is defined as follows:

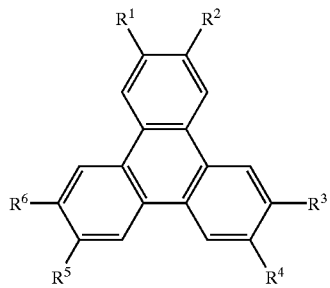

(1)

wherein $R^1$ to $R^6$ each are independent groups having different numbers of groups represented by formula (2) and formula (3) in one molecule, wherein the number of a group represented by the formula (3) in the mixture being 1.1 to 2.9 per molecule; wherein a group represented by formula (2) is as follows:

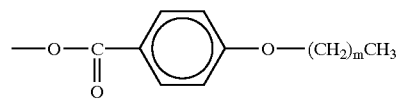

(2)

where m is a number of 1 to 15, and a group represented by the formula (3) is as follows:

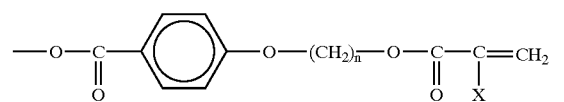

(3)

wherein X is a hydrogen atom or methyl group, and n is a number of 1 to 15.

24. A photoelectric conversion device having a layer which comprises the high-speed charge transport material of claim 21.

25. An electroluminescence device having a layer which comprises the high-speed charge transport material of claim 21.

* * * * *